(12) United States Patent
Sano

(10) Patent No.: US 10,991,508 B2
(45) Date of Patent: Apr. 27, 2021

(54) FILM CAPACITOR

(71) Applicant: Panasonic Intellectual Property Management Co., Ltd., Osaka (JP)

(72) Inventor: Masahito Sano, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 152 days.

(21) Appl. No.: 16/375,900

(22) Filed: Apr. 5, 2019

(65) Prior Publication Data

US 2019/0237253 A1 Aug. 1, 2019

Related U.S. Application Data

(63) Continuation of application No. PCT/JP2017/034230, filed on Sep. 22, 2017.

(30) Foreign Application Priority Data

Oct. 28, 2016 (JP) .............................. JP2016-211998

(51) Int. Cl.
*H01G 4/015* (2006.01)
*H01G 4/18* (2006.01)
(Continued)

(52) U.S. Cl.
CPC ............ *H01G 4/015* (2013.01); *H01G 4/008* (2013.01); *H01G 4/18* (2013.01); *H01G 4/33* (2013.01)

(58) Field of Classification Search
CPC .................................................... H01G 4/015
See application file for complete search history.

(56) References Cited

U.S. PATENT DOCUMENTS 6,757,151 B2 *  6/2004  Eriksson ................ H01G 4/012
361/273

FOREIGN PATENT DOCUMENTS

CN     204884887 U     12/2015
CN     205376302 U     7/2016
(Continued)

OTHER PUBLICATIONS

International Search Report of PCT application No. PCT/JP2017/034230 dated Nov. 14, 2017.
(Continued)

*Primary Examiner* — Eric W Thomas
(74) *Attorney, Agent, or Firm* — McDermott Will and Emery LLP

(57) ABSTRACT

A film capacitor includes a first film, a second film, a first electrode part, and a second electrode part. The first electrode part includes a first aluminum-containing layer disposed on a first film surface. The second electrode part includes a second aluminum-containing layer disposed on a second film surface. The first film and the second film stacked on one another are wound or stacked. The first film surface is provided with a first non-electrode part that does not include the first aluminum-containing layer and extends in the longitudinal direction of the first film surface. The first electrode part has a first end adjacent to the first non-electrode part. The second film surface is provided with a second non-electrode part that does not include the second aluminum-containing layer and extends in the longitudinal direction of the second film surface. The second electrode part has a second end adjacent to the second non-electrode part. A film capacitor further includes a first zinc-containing layer disposed on the surface of a part including the first end and a second zinc-containing layer disposed on the surface of a part including the second end.

9 Claims, 11 Drawing Sheets

(51) Int. Cl.
*H01G 4/33* (2006.01)
*H01G 4/008* (2006.01)

(56) References Cited

FOREIGN PATENT DOCUMENTS

| | | |
|---|---|---|
| JP | 59-058926 U | 4/1984 |
| JP | 10189382 A * | 7/1998 |
| JP | 2004-241456 | 8/2004 |

OTHER PUBLICATIONS

English Translation of Chinese Search Report dated Sep. 3, 2020 for the related Chinese Patent Application No. 201780065263.2.

* cited by examiner

FILM CAPACITOR

RELATED APPLICATIONS

This application is a continuation of the PCT International Application No. PCT/JP2017/034230 filed on Sep. 22, 2017, which claims the benefit of foreign priority of Japanese patent application No. 2016-211998 filed on Oct. 28, 2016, the contents all of which are incorporated herein by reference.

BACKGROUND

1. Technical Field

The present disclosure relates to a film capacitor.

2. Description of the Related Art

Unexamined Japanese Patent Publication No. 2004-241456 discloses a metallized film capacitor obtained by winding or stacking two metalized films each composed of a metal-deposited part where a metal mainly containing zinc is deposited on a dielectric film, and a non-deposition part where no metal is deposited on a dielectric film. In the metallized film capacitor, by increasing the zinc concentration in a part of the metal-deposited part close to the non-deposition part, a corrosion phenomenon caused at the metal-deposition part can be suppressed.

SUMMARY

A film capacitor according to a first aspect of the present disclosure includes a first film, a second film, a first electrode part, and a second electrode part. The first electrode part includes a first aluminum-containing layer disposed on a first film surface that is one principal surface of the first film. The second electrode part includes a second aluminum-containing layer disposed on a second film surface that is one of another principal surface of the first film and a principal surface of the second film that faces to the another principal surface. The first film and the second film stacked on one another are wound or stacked. In this regard, the first film surface is provided with a first non-electrode part that does not include the first aluminum-containing layer, and extends in the longitudinal direction of the first film surface. The first electrode part has a first end adjacent to the first non-electrode part in the widthwise direction of the first film surface. In addition, the second film surface is provided with a second non-electrode part that does not include the second aluminum-containing layer and extends in the longitudinal direction of the second film surface. The second electrode part has a second end adjacent to the second non-electrode part in the width direction of the second film surface. Furthermore, the film capacitor further includes a first zinc-containing layer disposed on the surface of a part including the first end of the first electrode part and a second zinc-containing layer disposed on the surface of a part including the second end of the second electrode part.

A film capacitor according to a second aspect of the present disclosure includes a first film, a second film, a first electrode part, and a second electrode part. The first electrode part includes a first aluminum-containing layer disposed on a first film surface that is one principal surface of the first film. The second electrode part includes a second aluminum-containing layer disposed on a second film surface that is one of another principal surface of the first film and a principal surface of the second film that faces to the another principal surface. The first film and the second film stacked on one another are wound or stacked. In this regard, the first film surface is provided with a first non-electrode part that does not include the first aluminum-containing layer, extends in the longitudinal direction of the first film surface, and splits the first electrode part into two parts in the widthwise direction of the first film surface. Each of the two parts of the first electrode part has a first end adjacent to the first non-electrode part. In addition, the second film surface is provided with a second non-electrode part that does not include the second aluminum-containing layer and is disposed at each of both ends in the widthwise direction of the second film surface. The second electrode part has a second end adjacent to the second non-electrode part. Furthermore, the film capacitor further includes a first zinc-containing layer disposed on a surface of a part including the first end of the first electrode part and a second zinc-containing layer disposed on a surface of a part including the second end of the second electrode part.

A film capacitor according to a third aspect of the present disclosure includes a first film, a second film, a first electrode part, and a second electrode part. The first electrode part includes a first aluminum-containing layer disposed on a first film surface that is one principal surface of the first film. The second electrode part includes a second aluminum-containing layer disposed on a second film surface that is one of another principal surface of the first film and a principal surface of the second film that faces to the another principal surface. The first film and the second film stacked on one another are wound or stacked. In this regard, the first film surface is provided with a first non-electrode part that does not include the first aluminum-containing layer and extends in the longitudinal direction of the first film surface. The first electrode part has a first end adjacent to the first non-electrode part in the widthwise direction of the first film surface. In addition, the second film surface is provided with a second non-electrode part that does not include the second aluminum-containing layer and extends in the longitudinal direction of the second film surface. The second electrode part has a second end adjacent to the second non-electrode part in the widthwise direction of the second film surface. Furthermore, the film capacitor further includes a zinc-containing layer disposed on at least one of a surface of a part including the first end of the first electrode part and a surface of a part including the second end of the second electrode part.

According to the present disclosure, a film capacitor can be provided which can suppress the generation of a corrosion phenomenon while securing high moisture resistance.

Effects or meanings of the present disclosure will be further clarified in the following description of an exemplary embodiment. However, the exemplary embodiment described below is merely an example of practicing the present disclosure, and the present disclosure is not at all limited to the examples described in the following exemplary embodiments.

DETAILED DESCRIPTION OF EMBODIMENT

Figure 1A:
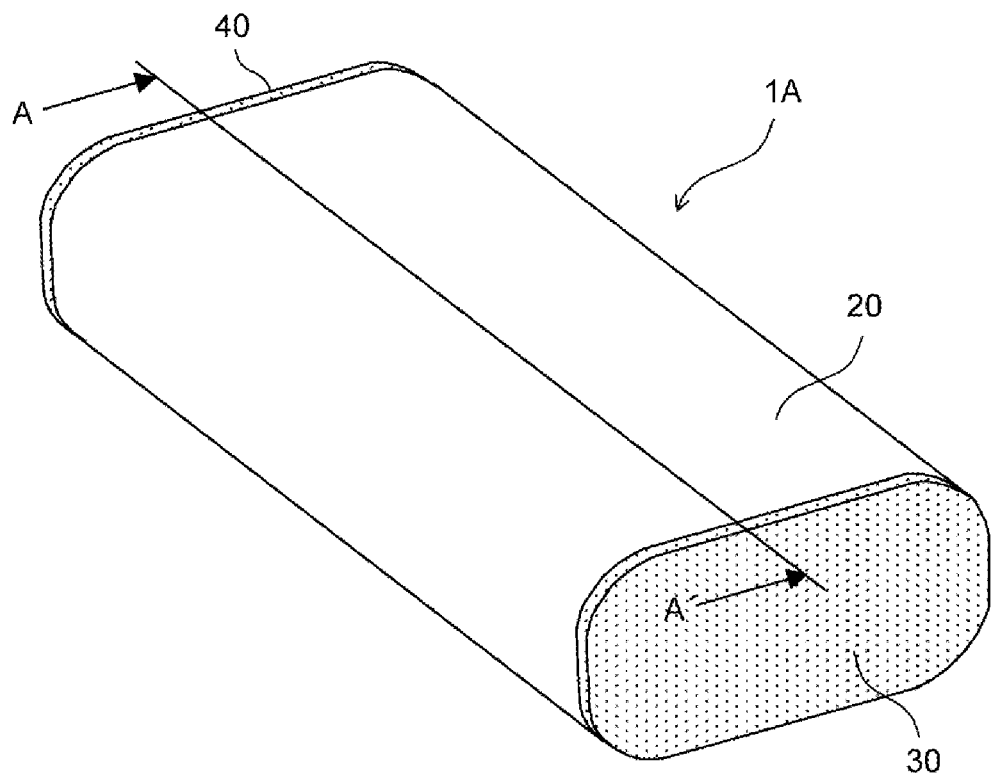
FIG. 1A is a perspective view illustrating a film capacitor according to a first exemplary embodiment.

The metallized film capacitor in Unexamined Japanese Patent Publication No. 2004-241456 is more likely to be low in moisture resistance, because the metal-deposited part is formed from the metal mainly containing zinc.

The present disclosure thus provides a film capacitor which can suppress the generation of a corrosion phenomenon while securing high moisture resistance.

Exemplary embodiments of the present disclosure will be described below with reference to the accompanying drawings.

First Exemplary Embodiment

First, film capacitor 1A according to a first exemplary embodiment will be described.

In the present exemplary embodiment, film surface 100a is an example of a "first film surface" recited in the claims. In addition, middle insulating margin part 101 is an example of a "first non-electrode part" recited in the claims. Furthermore, film surface 200a is an example of a "second film surface" recited in the claims. In addition, end insulating margin part 201 is an example of a "second non-electrode part" recited in the claims. Furthermore, first deposition electrode 300 is an example of a "first electrode part" recited in the claims. Furthermore, ends 301a, 302a are examples of a "first end" recited in the claims. Furthermore, second deposition electrode 400 is an example of a "second electrode part" recited in the claims. Furthermore, ends 400c, 400d are examples of a "second end" recited in the claims.

However, the above description is only intended to define correspondences between components in the claims and components in the exemplary embodiment. The correspondences described above do not limit the scope of the disclosure in the claims to the configuration described in the exemplary embodiment.

Figure 1B:
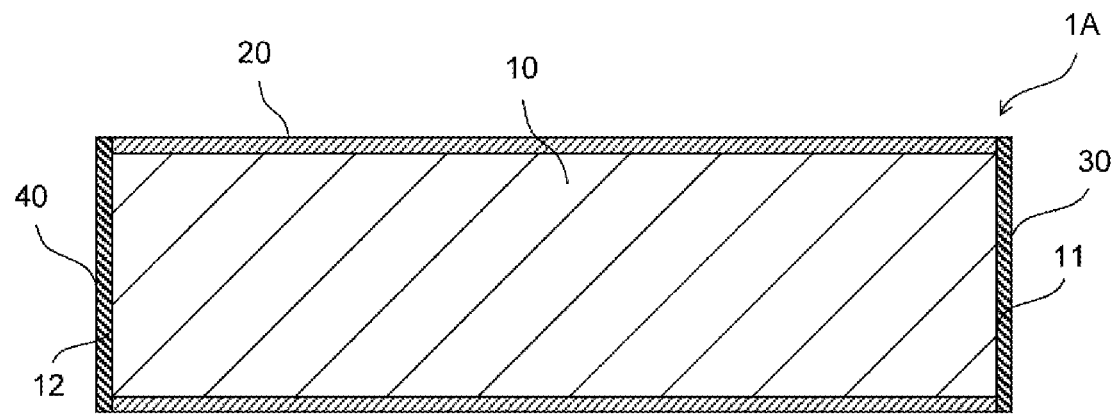
FIG. 1B is a vertical sectional view of the film capacitor cut along the line A-A' of FIG. 1A.

FIG. 1A is a perspective view illustrating film capacitor 1A according to the first exemplary embodiment, and FIG. 1B is a vertical sectional view of film capacitor 1A taken along line A-A' of FIG. 1A.

Film capacitor 1A includes capacitor body 10, exterior film 20, first end-face electrode 30, and second end-face electrode 40. Film capacitor 1A is formed into a flat columnar shape having an elliptic section.

Capacitor body 10 is formed by winding two dielectric films in a stacked state, on which deposition electrodes are formed. Film capacitor 1A, i.e., capacitor body 10, employs a structure having two capacitors connected in series. A configuration of capacitor body 10 will be described in detail later.

Exterior film 20 is wound around an outer circumferential surface of capacitor body 10 a plurality of times (a plurality of turns). The outer circumferential surface of capacitor body 10 is covered by exterior film 20 with a plurality of layers to prevent capacitor body 10 from, for example, being damaged or broken. Examples of a material for exterior film 20 include polypropylene (PP), polyethylene terephthalate (PET), and polyethylene naphthalate (PEN).

First end-face electrode 30 and second end-face electrode 40 are respectively formed by thermally spraying a metal such as aluminum, zinc, or magnesium onto first end face 11 and second end face 12 of capacitor body 10. A lead-out terminal (not shown) such as a bus bar or lead wire for drawing out electricity from film capacitor 1A is connected to first end-face electrode 30 and second end-face electrode 40.

A configuration of capacitor body 10 will be described in detail next.

Figure 2A:
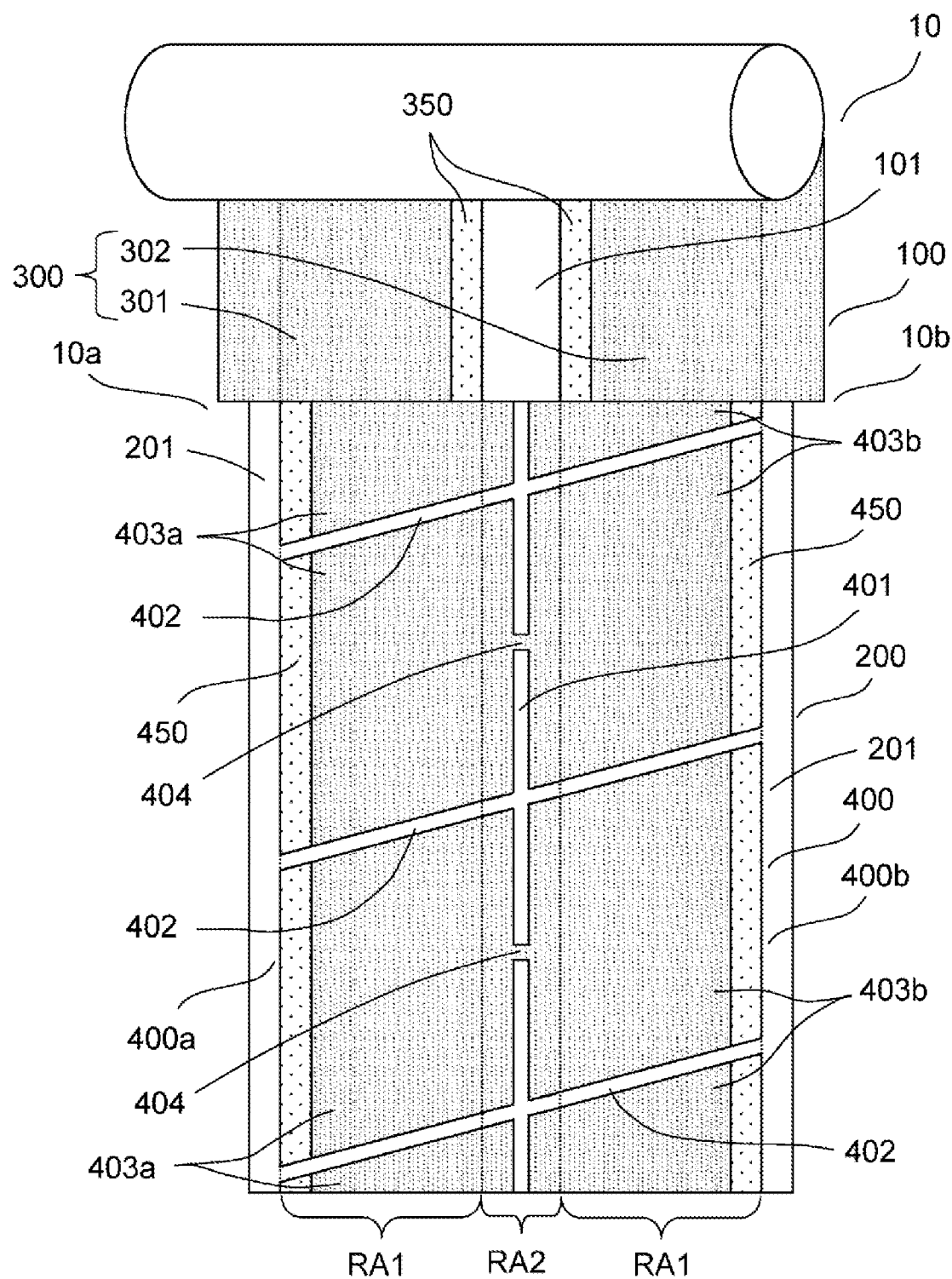
FIG. 2A is a plan view illustrating a capacity body in a state in which a first film and a second film are partly wound according to the first exemplary embodiment.
Figure 2B:
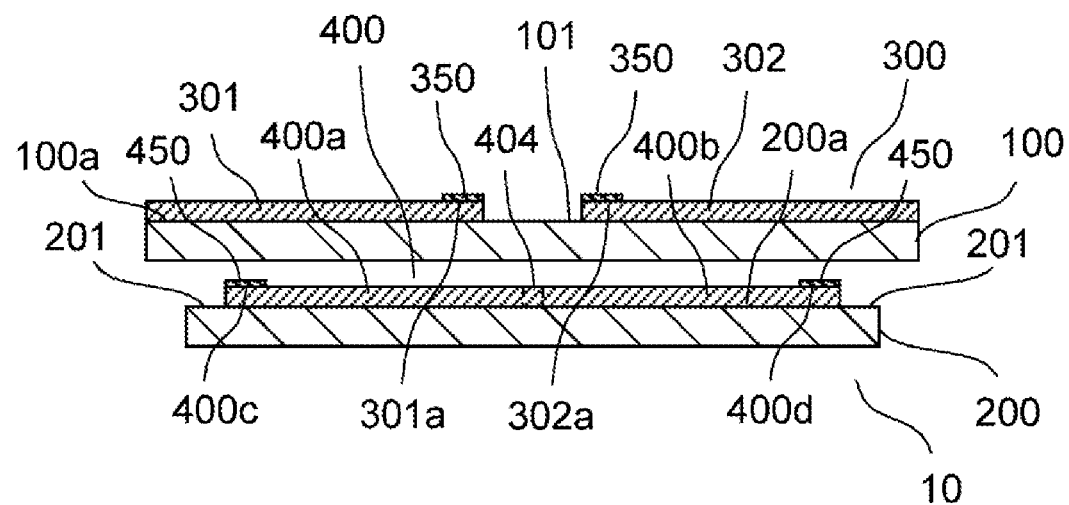
FIG. 2B is a sectional view of the capacitor body cut at a site with a fuse pattern in a widthwise direction according to the first exemplary embodiment.
Figure 2C:
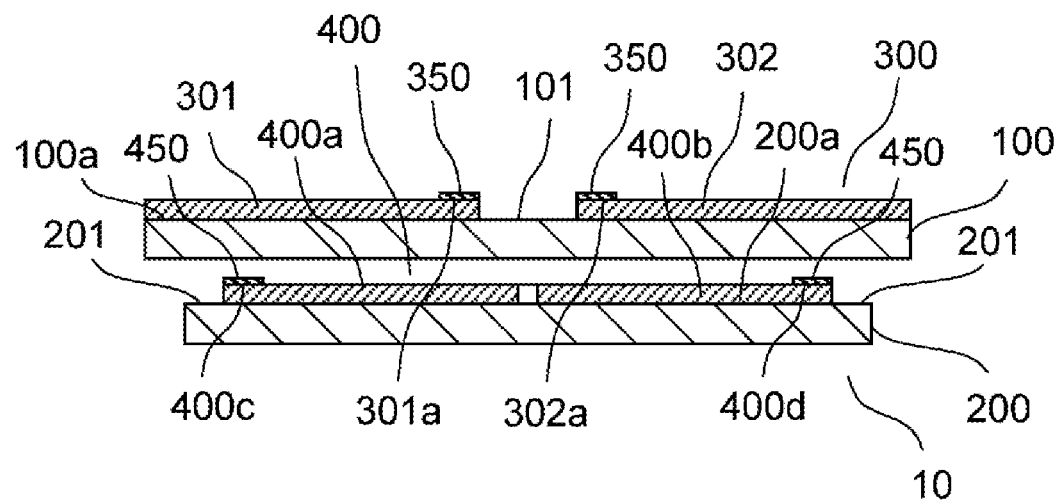
FIG. 2C is a sectional view of the capacitor body cut at a site without a fuse pattern in a widthwise direction according to the first exemplary embodiment.

FIG. 2A is a plan view illustrating capacitor body 10 in a state in which first film 100 and second film 200 are partly wound according to the first exemplary embodiment. FIG. 2B is a sectional view of capacitor body 10 cut at a site with fuse pattern 404 in a widthwise direction according to the first exemplary embodiment, and FIG. 2C is a sectional view of capacitor body 10 cut at a site without fuse pattern 404 in a widthwise direction according to the first exemplary embodiment.

Capacitor body 10 includes first film 100, second film 200, first deposition electrode 300, and second deposition electrode 400.

First film 100 and second film 200 are wound in a state in which first film 100 is located inside (on an upper side) and second film 200 is located outside (on a lower side). First film 100 and second film 200 are dielectric films each formed of a resin material such as polypropylene (PP), polyethylene terephthalate (PET), and polyethylene naphthalate (PEN). First film 100 has a larger width dimension than second film 200. Middle insulating margin part 101 is formed on a widthwise middle of first film 100 so as to extend in a longitudinal direction of first film 100. End insulating margin parts 201 are formed on both widthwise ends of second film 200 so as to extend in the longitudinal direction. Middle insulating margin part 101 and end insulating margin parts 201 are margin parts on which metal, that is, aluminum-containing layer, is not deposited.

First deposition electrode 300, which is an aluminum-containing layer, is formed on one (upper) film surface 100a of first film 100. The aluminum-containing layer is formed by deposition of, for example, aluminum, or an alloy of aluminum and a metal such as magnesium. It is to be noted that the metal that is alloyed with aluminum preferably contains no zinc. First deposition electrode 300 is split into first continuous electrode 301 and second continuous electrode 302 in the widthwise direction by middle insulating margin part 101. Each of first continuous electrode 301 and second continuous electrode 302 is formed continuously without being split in the longitudinal direction of first film 100. First continuous electrode 301 is formed up to one end of first film 100 in the widthwise direction and is to be connected with first end-face electrode 30. Second continuous electrode 302 is formed up to the other end of first film 100 in the widthwise direction and is to be connected with second end-face electrode 40.

Second deposition electrode 400, which is an aluminum-containing layer similar to first deposition electrode 300, is formed on one (upper) film surface 200a of second film 200 which faces the other (lower) film surface of first film 100. Second deposition electrode 400 is formed between end insulating margin parts 201 that are respectively disposed at two ends of second film 200.

Second deposition electrode 400 has longitudinal slit part 401 formed in a widthwise middle of second deposition electrode 400 so as to extend in the longitudinal direction of second deposition electrode 400. In addition, widthwise slit parts 402 are formed in second deposition electrode 400 at predetermined intervals in the longitudinal direction so as to cross the second deposition electrode 400 in the widthwise direction. Each widthwise slit part 402 is formed to extend from end insulating margin part 201 on one end side to end insulating margin part 201 on the other end side so as to be inclined with respect to the widthwise direction.

Second deposition electrode 400 is split by longitudinal slit part 401 into first one-side electrode 400a and second one-side electrode 400b that are arranged in the widthwise direction. In addition, first one-side electrode 400a is divided by widthwise slit parts 402 into a plurality of first split electrodes 403a that are arranged in the longitudinal direction of the electrode. Second one-side electrode 400b is divided by widthwise slit parts 402 into a plurality of second split electrodes 403b that are arranged in the longitudinal direction of the electrode.

First continuous electrode 301 and first one-side electrode 400a constitute first capacitor 10a, and second continuous electrode 302 and second one-side electrode 400b constitute second capacitor 10b. Second capacitor 10b is connected in series to first capacitor 10a.

Capacitor body 10 includes effective electrode region RA1 and ineffective electrode region RA2. Effective electrode region RA1 is a region where first deposition electrode 300 (i.e. first continuous electrode 301 and second continuous electrode 302) and second deposition electrode 400 overlap each other. And ineffective electrode region RA2 is a region other than effective electrode region RA1 in the widthwise direction of first deposition electrode 300 and second deposition electrode 400. In other words, ineffective electrode region RA2 is a region where second deposition electrode 400 overlaps middle insulating margin part 101 of first film 100.

Longitudinal slit part 401 overlaps middle insulating margin part 101. That is, longitudinal slit part 401 is provided in ineffective electrode region RA2. Accordingly, in second deposition electrode 400, ineffective electrode region RA2 includes portions located near longitudinal slit part 401 of first one-side electrode 400a and second one-side electrode 400b, which overlap middle insulating margin part 101. Further, effective electrode region RA1 includes a portion overlapping first continuous electrode 301 of first one-side electrode 400a. And effective electrode region RA1 includes a portion overlapping second continuous electrode 302 of second one-side electrode 400b. Effective electrode region RA1 formed between first continuous electrode 301 and first one-side electrode 400a contributes to a capacitance of first capacitor 10a. And effective electrode region RA1 formed between second continuous electrode 302 and second one-side electrode 400b contributes a capacitance of second capacitor 10b.

Fuse pattern 404 is formed between each first split electrode 403a and each second split electrode 403b so as to bridge over longitudinal slit part 401 between each first split electrode 403a and each second split electrode 403b. In other words, in second deposition electrode 400, longitudinal slit part 401 is disconnected by fuse pattern 404 with a width thereof. A pattern width of fuse pattern 404 is set to, for example, about 0.5 mm.

First zinc-containing layer 350 formed by deposition of zinc is disposed on the surface of first deposition electrode 300 (i.e. first continuous electrode 301 and second continuous electrode 302) at each of ends 301a, 302a adjacent to middle insulating margin part 101. First zinc-containing layer 350 is not formed on the entire or partial regions other than ends 301a, 302a of the surfaces of first continuous electrode 301 and second continuous electrode 302. First zinc-containing layer 350 is smaller in thickness than first continuous electrode 301 and second continuous electrode 302, which are aluminum-containing layers.

Second zinc-containing layer 450 formed by deposition of zinc is disposed on the surface of second deposition electrode 400 (i.e. first one-side electrode 400a including each first split electrode 403a and second one-side electrode 400b including each second split electrode 403b) at each of ends 400c, 400d adjacent to end insulating margin part 201. Second zinc-containing layer 450 is not formed on the entire or partial regions other than ends 400c, 400d of the surfaces of first one-side electrode 400a and second one-side electrode 400b. Second zinc-containing layer 450 is smaller in thickness than first one-side electrode 400a and second one-side electrode 400b, which are aluminum-containing layers.

It is to be noted that metal other than zinc may be slightly contained in first zinc-containing layer 350 and second zinc-containing layer 450.

In addition, first zinc-containing layer 350 may be further formed, as baby edges connected to first end-face electrode 30 and second end-face electrode 40, on the surface of first continuous electrode 301 at another end different from end 301a, and on the surface of second continuous electrode 302 at another end different from end 302a. In such a case, first zinc-containing layer 350 is not formed on the entire or partial regions other than the both ends of first continuous electrode 301 and both ends of second continuous electrode 302. Furthermore, instead of not forming first zinc-containing layer 350 at the regions other than the both ends of first continuous electrode 301 and the both ends of second continuous electrode 302, a zinc-containing layer having a thickness smaller than that of first zinc-containing layer 350 may be formed.

Furthermore, instead of not forming second zinc-containing layer 450 formed at the regions other than ends 400c, 400d of the surfaces of first one-side electrode 400a and second one-side electrode 400b, a zinc-containing layer having a thickness smaller than that of second zinc-containing layer 450 may be formed.

Furthermore, in wound state of capacitor body 10, first zinc-containing layer 350 has a part in contact with the lower surface of second film 200. In addition, the aluminum-containing layer of first deposition electrode 300 has a part in contact with the lower surface of second film 200.

In a case in which first continuous electrode 301, second continuous electrode 302, first one-side electrode 400a, and second one-side electrode 400b are constituted by aluminum-containing layers, high moisture resistance can be secured. In this case, however, a corrosion phenomenon, which is oxidization of the aluminum-containing layers due to corona discharge, is likely to occur at ends 301a, 302a, 400c, 400d of first continuous electrode 301, second continuous electrode 302, first one-side electrode 400a, and second one-side electrode 400b. Since the corrosion phenomenon causes effective electrode region RA1 narrow (lose), the capacitance would more likely to decrease.

According to the present exemplary embodiment, first zinc-containing layer 350 is formed on ends 301a, 302a of first continuous electrode 301 and second continuous electrode 302, whereas second zinc-containing layer 450 is formed on ends 400c, 400d of first one-side electrode 400a and second one-side electrode 400b. Accordingly, the corrosion phenomenon due to corona discharge is unlikely to occur at ends 301a, 302a, 400c, 400d.

According to the present exemplary embodiment, the corrosion phenomenon can be kept from occurring, while high moisture resistance of first continuous electrode 301, second continuous electrode 302, first one-side electrode 400a, and second one-side electrode 400b is secured.

Furthermore, first continuous electrode 301 and second continuous electrode 302 are easily formed because the aluminum-containing layers of the electrodes are entirely uniform in thickness. In addition, since first zinc-containing layers 350 are made smaller in thickness than the aluminum-containing layer, thicknesses at ends 301a, 302a of the metal layers including the aluminum-containing layers and first zinc-containing layers 350 can be kept from increasing. Hence, when breakdown occurs at ends 301a, 302a, the metal layers can be easily scattered, and thus generation of leakage current can be suppressed. Likewise, first one-side electrode 400a and second one-side electrode 400b are easily formed because the aluminum-containing layers of the electrodes are entirely uniform in thickness. In addition, since second zinc-containing layers 450 are made smaller in thickness than the aluminum-containing layer, when breakdown occurs at ends 400c, 400d, generation of leakage current can be suppressed.

Second Exemplary Embodiment

Next, film capacitor 1B according to a second exemplary embodiment will be described.

In the present exemplary embodiment, film surface 500a is an example of a "first film surface" recited in the claims. In addition, first insulating margin part 501 is an example of a "first non-electrode part" recited in the claims. Furthermore, film surface 600a is an example of a "second film surface" recited in the claims. In addition, second insulating margin part 601 is an example of a "second non-electrode part" recited in the claims. Furthermore, first deposition electrode 700 is an example of a "first electrode part" recited in the claims. Furthermore, end 700a is an example of a "first end" recited in the claims. Furthermore, second deposition electrode 800 is an example of a "second electrode part" recited in the claims. Furthermore, end 800a is an example of a "second end" recited in the claims.

However, the above description is only intended to define correspondences between components in the claims and components in the exemplary embodiment. The correspondences described above do not limit the scope of the disclosure in the claims to the configuration described in the exemplary embodiment.

Figure 3A:
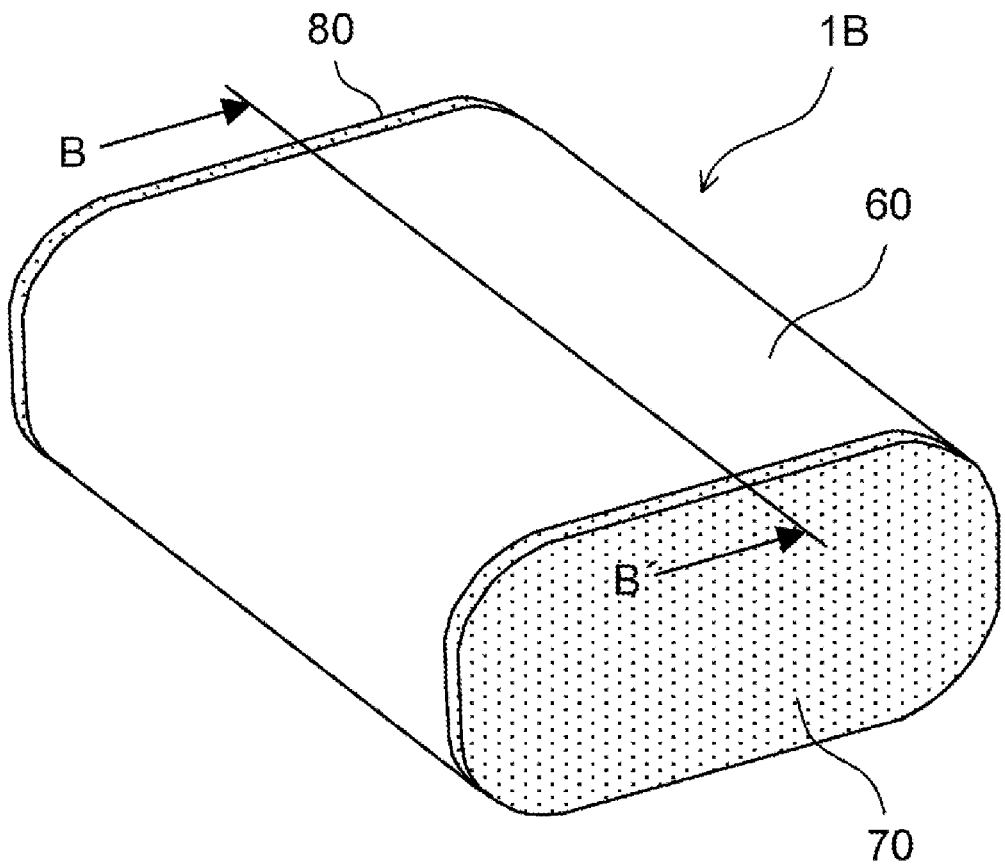
FIG. 3A is a perspective view illustrating a film capacitor according to the second exemplary embodiment.
Figure 3B:
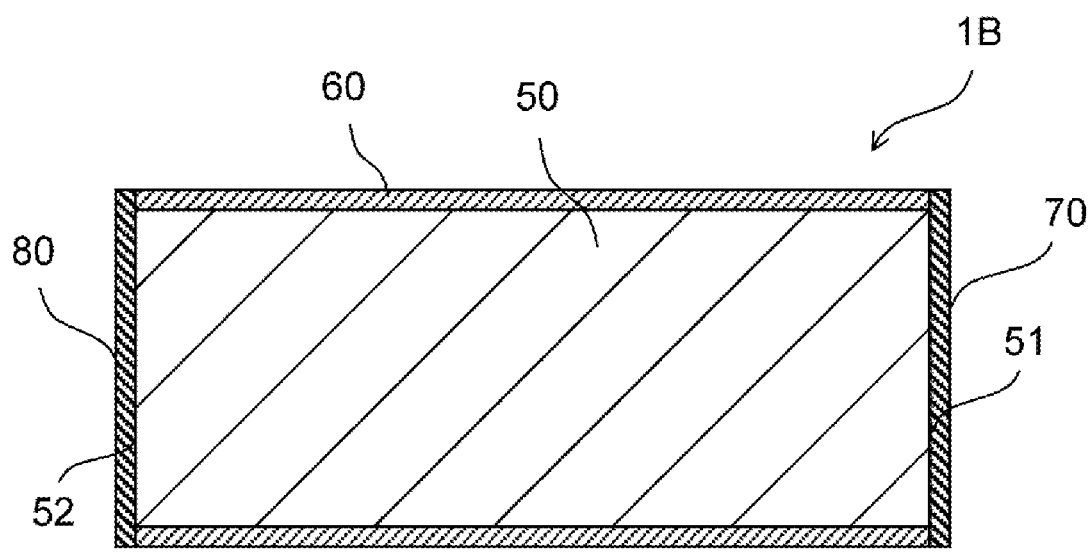
FIG. 3B is a vertical sectional view of the film capacitor cut along the line B-B' of FIG. 3A.

FIG. 3A is a perspective view illustrating film capacitor 1B according to the second exemplary embodiment, and FIG. 3B is a vertical sectional view of film capacitor 1B taken along the lie B-B' in FIG. 3A.

Film capacitor 1B includes capacitor body 50, exterior film 60, first end-face electrode 70, and second end-face electrode 80. Exterior film 60, first end-face electrode 70, and second end-face electrode 80 have the same configurations as those of exterior film 20, first end face electrode 30, and second end face electrode 40 of film capacitor 1A according to the first exemplary embodiment. Film capacitor 1B, i.e., capacitor body 50, employs a structure formed of one capacitor. Hence, a width between first end face 51 and second end face 52 of capacitor body 50 is smaller than a width between first end face 11 and second end face 12 of capacitor body 10 of film capacitor 1A according to the first exemplary embodiment.

Figure 4A:
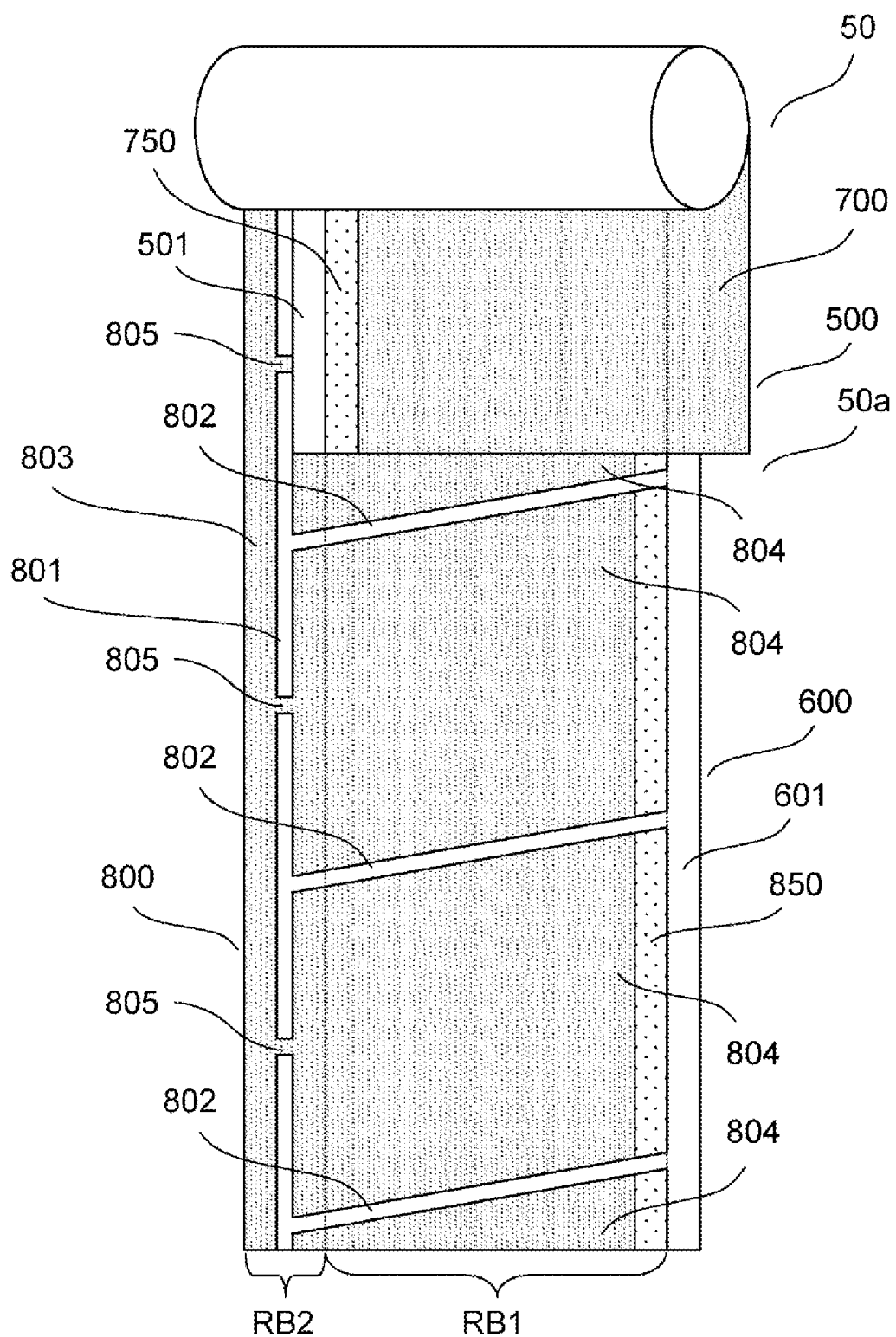
FIG. 4A is a plan view illustrating a capacitor body in a state in which a first film and a second film are partly wound according to the second exemplary embodiment.
Figure 4B:
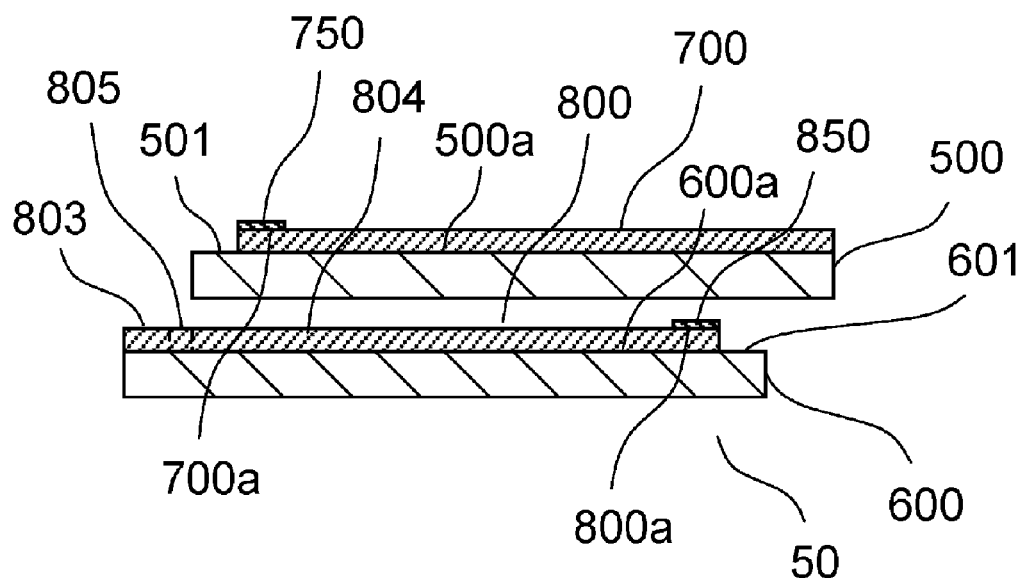
FIG. 4B is a sectional view of the capacitor body cut at a site with a fuse pattern in a widthwise direction according to the second exemplary embodiment.
Figure 4C:
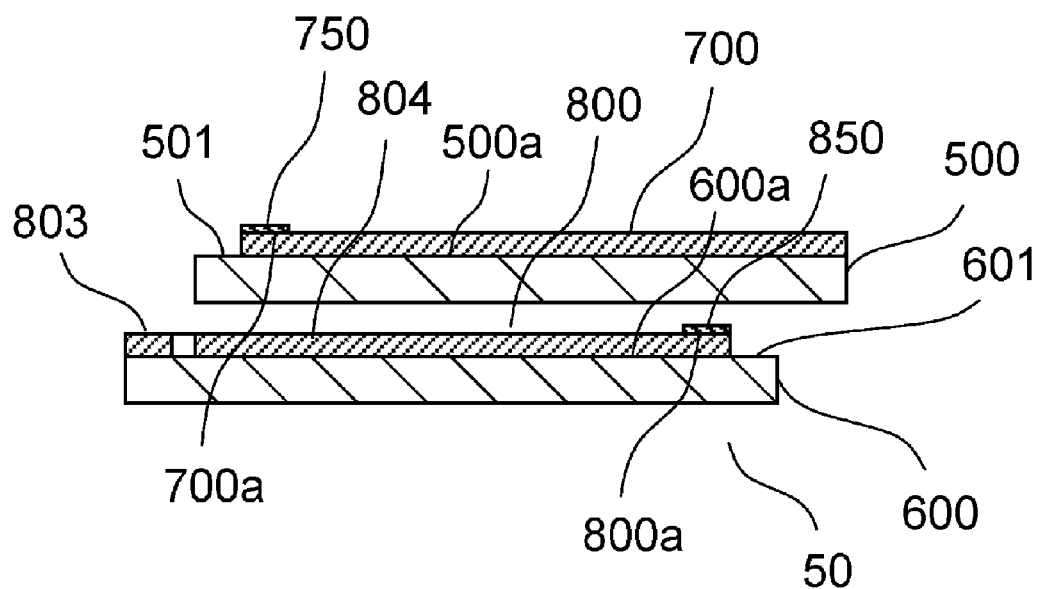
FIG. 4C is a sectional view of the capacitor body cut at a site without a fuse pattern in a widthwise direction according to the second exemplary embodiment.

FIG. 4A is a plan view illustrating capacitor body 50 in a state in which first film 500 and second film 600 are partly wound according to the second exemplary embodiment. FIG. 4B is a sectional view of capacitor body 50 cut in the widthwise direction at a site with fuse pattern 805 according to the second exemplary embodiment, and FIG. 4C is a sectional view of capacitor body 50 cut in the widthwise direction at a site without fuse pattern 805.

Capacitor body 50 includes first film 500, second film 600, first deposition electrode 700, and second deposition electrode 800.

First film 500 and second film 600 are wound in a stacked state such that first film 500 is located inside (on an upper side), and second film 600 is located outside (on a lower side). First film 500 and second film 600 are dielectric films formed of a resin material such as polypropylene (PP), polyethylene terephthalate (PET), and polyethylene naphthalate (PEN).

First film 500 and second film 600 have almost the same width dimension. First insulating margin part 501 is formed on one end of first film 500 in a widthwise direction of first film 500 so as to extend in a longitudinal direction of first film 500. Second insulating margin part 601 is formed on one end of second film 600, which is located at a side opposite to the one end of first film 500, in a widthwise direction of second film 600 so as to extend in a longitudinal direction of second film 600. First insulating margin part 501 and second insulating margin part 601 are margin parts on which metal, that is, aluminum-containing layer is not deposited.

First deposition electrode 700, which is an aluminum-containing layer, is formed on one (upper) film surface 500a of first film 500. The aluminum-containing layer is formed by deposition of, for example, aluminum, or an alloy of aluminum and a metal such as magnesium. It is to be noted that the metal that is alloyed with aluminum preferably contains no zinc. First deposition electrode 700 is formed so as to be continuous without being split in the longitudinal direction of first film 500. First deposition electrode 700 is formed up to the other end in the widthwise direction of first film 500 so as to be connected with second end-face electrode 80.

Second deposition electrode 800, which is an aluminum-containing layer similar to first deposition electrode 700, is formed on one (upper) film surface 600a of second film 600 which faces the other (lower) film surface of first film 500. Second deposition electrode 800 is formed up to an end of second film 600 which is located at a side opposite to a second insulating margin part 601 in the widthwise direction so as to be connected with first end-face electrode 70.

Longitudinal slit part 801 is formed in an end portion of second deposition electrode 800 which is connected with first end-face electrode 70 so as to extend in a longitudinal direction of second deposition electrode 800. Widthwise slit parts 802 are formed in second deposition electrode 800 so as to cut second deposition electrode 800 along a widthwise direction of second deposition electrode 800 at predetermined intervals in a longitudinal direction of second deposition electrode 800. Widthwise slit parts 802 are formed to extend from longitudinal slit part 801 to second insulating margin part 601 so as to be inclined with respect to the widthwise direction. Second deposition electrode 800 is split into common electrode 803 and a plurality of split electrodes 804 by longitudinal slit part 801 and the plurality of widthwise slit parts 802. Common electrode 803 extends in the longitudinal direction of second deposition electrode 800 and connected with first end-face electrode 70. And a plurality of split electrodes 804 are arranged in the longitudinal direction of second deposition electrode 800.

Capacitor 50a is constituted by first deposition electrode 700 and each split electrode 804 facing first deposition electrode 700.

Capacitor body 50 includes effective electrode region RB1 and ineffective electrode region RB2. Effective electrode region RB1 is a region where first deposition electrode 700 and second deposition electrode 800 overlap each other. And ineffective electrode region RB2 is a region other than effective electrode region RB1 in the widthwise direction of first deposition electrode 700 and second deposition electrode 800.

Longitudinal slit part 801 is provided in ineffective electrode region RB2. Accordingly, in second deposition electrode 800, ineffective electrode region RB2 includes a portion located near longitudinal slit part 801 of each split electrode 804. Effective electrode region RB1 includes a portion overlapping first deposition electrode 700 of each split electrode 804. Effective electrode region RB1 contributes a capacitance of capacitor 50a.

Fuse pattern 805 is formed between each split electrode 804 and common electrode 803 so as to bridge over longitudinal slit part 801 between each split electrode 804 and common electrode 803. A pattern width of fuse pattern 805 is set to, for example, about 0.5 mm.

First zinc-containing layer 750 formed by deposition of zinc is disposed on the surface of first deposition electrode 700 at end 700a adjacent to first insulating margin part 501. First zinc-containing layer 750 is not formed on the entire or partial region other than end 700a of the surface of first deposition electrode 700. First zinc-containing layer 750 is smaller in thickness than first deposition electrode 700, which is an aluminum-containing layer.

Second zinc-containing layer 850 formed by deposition of zinc is disposed on the surface of second deposition electrode 800 at end 800a adjacent to second insulating margin part 601. Second zinc-containing layer 850 is not formed on the entire or partial region other than end 800a of the surface of second deposition electrode 800. Second zinc-containing layer 850 is smaller in thickness than second deposition electrode 800, which is an aluminum-containing layer.

It is to be noted that metal other than zinc may be slightly contained in first zinc-containing layer 750 and second zinc-containing layer 850.

In addition, first zinc-containing layer 750 may be further formed, as a baby edge connected to second end-face electrode 80, on the surface of first deposition electrode 700 at another end different from end 700a. In such a case, first zinc-containing layer 750 is not formed on the entire or partial region other than the both ends of first deposition electrode 700. Furthermore, instead of not forming first zinc-containing layer 750 at the region other than the both ends of first deposition electrode 700, a zinc-containing layer having a thickness smaller than that of first zinc-containing layer 750 may be formed.

Furthermore, second zinc-containing layer 850 may be further formed, as a baby edge connected to first end-face electrode 70, on the surface of second deposition electrode 800 at another end different from end 800a. In such a case, second zinc-containing layer 850 is not formed on the entire or partial region other than the both ends of second deposition electrode 800.

Furthermore, instead of not forming second zinc-containing layer 850 at the region other than the both ends of second deposition electrode 800, a zinc-containing layer having a thickness smaller than that of second zinc-containing layer 850 may be formed.

Furthermore, in wound state of capacitor body 50, first zinc-containing layer 750 has a part in contact with the lower surface of second film 600. In addition, the aluminum-containing layer of first deposition electrode 700 has a part in contact with the lower surface of second film 600.

Also according to the present exemplary embodiment, as in the first exemplary embodiment, the corrosion phenomenon can be kept from occurring, while high moisture resistance of first deposition electrode 700 and second deposition electrode 800 is secured.

Modification Example

Although the exemplary embodiments of the present disclosure have been described above, the present disclosure is not limited to the exemplary embodiments described above, and moreover, various modifications can be applied to application examples according to the present disclosure besides the exemplary embodiments described above.

Figure 5A:
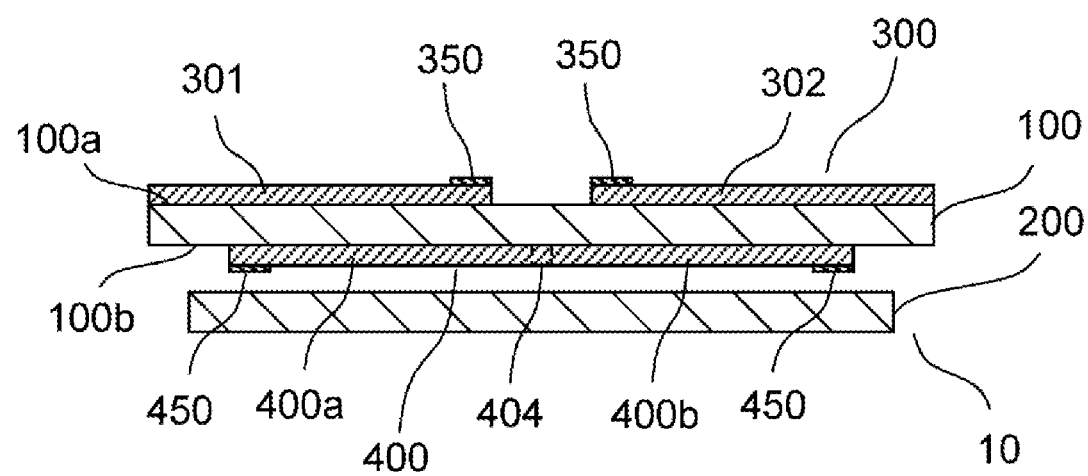
FIGS. 5A to 5F are views for explaining capacitor bodies according to modification examples.
Figure 5B:
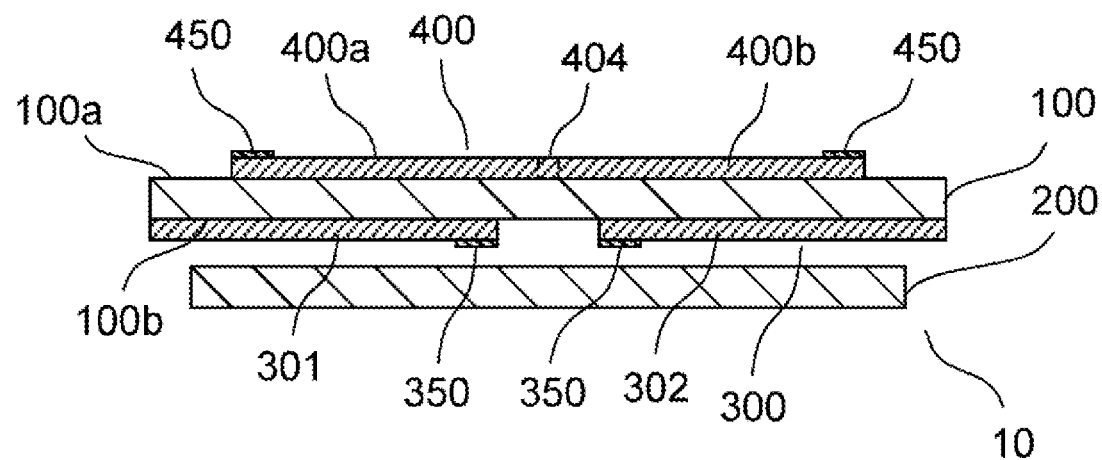
Figure 5C:
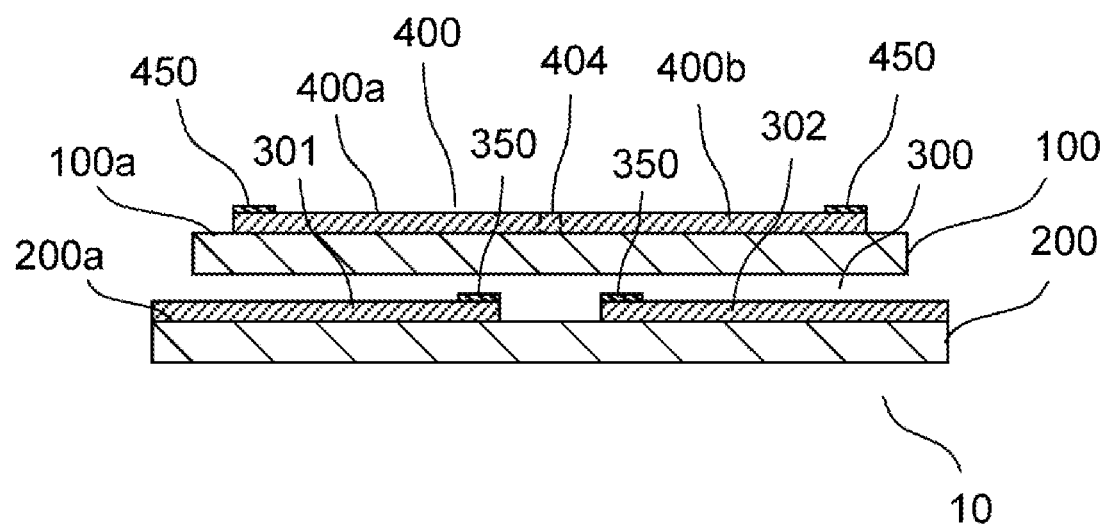

For example, in the above first exemplary embodiment, first deposition electrode 300 is formed on one (upper) film surface 100a of first film 100, and second deposition electrode 400 is formed on the other (upper) film surface 200a of second film 200. Meanwhile, as shown in FIG. 5A, first deposition electrode 300 may be formed on one (upper) film surface 100a of first film 100, and second deposition electrode 400 may be formed on the other (lower) film surface 100b of first film 100. Further, as shown in FIG. 5B, second deposition electrode 400 may be formed on one (upper) film surface 100a of first film 100, and first deposition electrode 300 may be formed on the other (lower) film surface 100b of first film 100. Further, as shown in FIG. 5C, second deposition electrode 400 may be formed on one (upper) film surface 100a of first film 100, and first deposition electrode 300 may be formed on the other (upper) film surface 200a of second film 200. In this case, the second film 200 has a larger width dimension than first film 100.

Figure 5D:
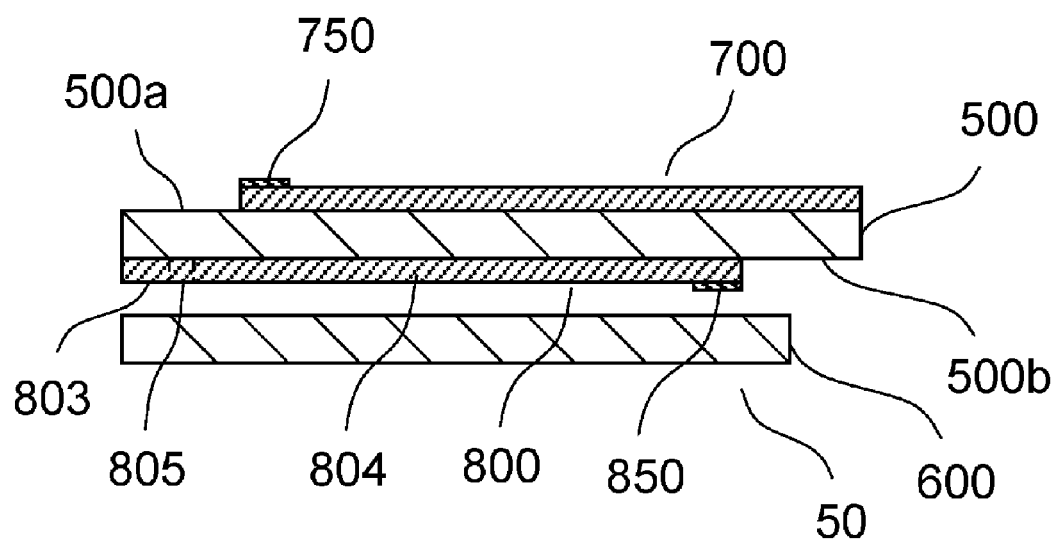
Figure 5E:
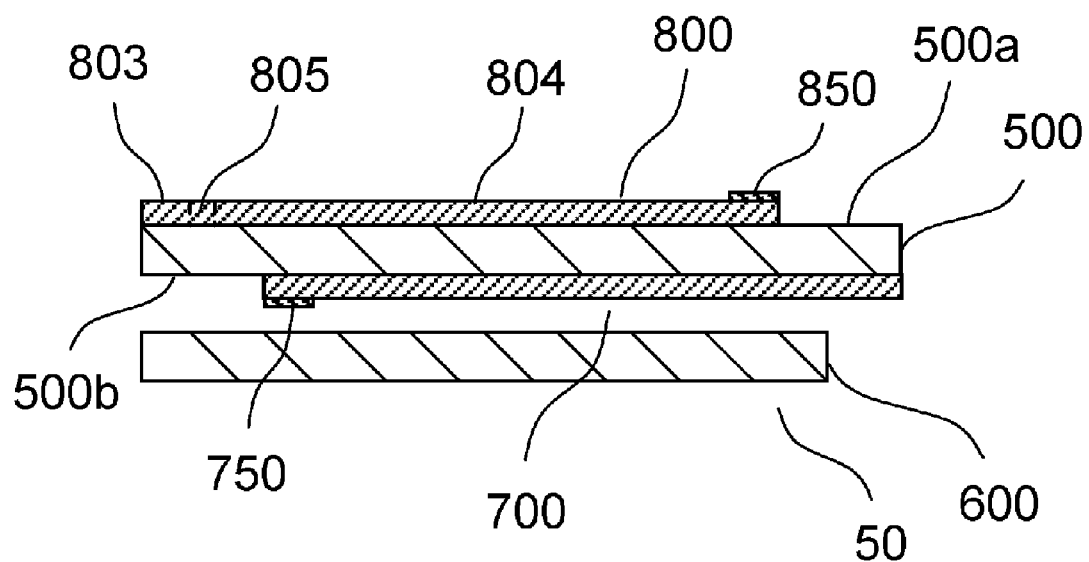
Figure 5F:
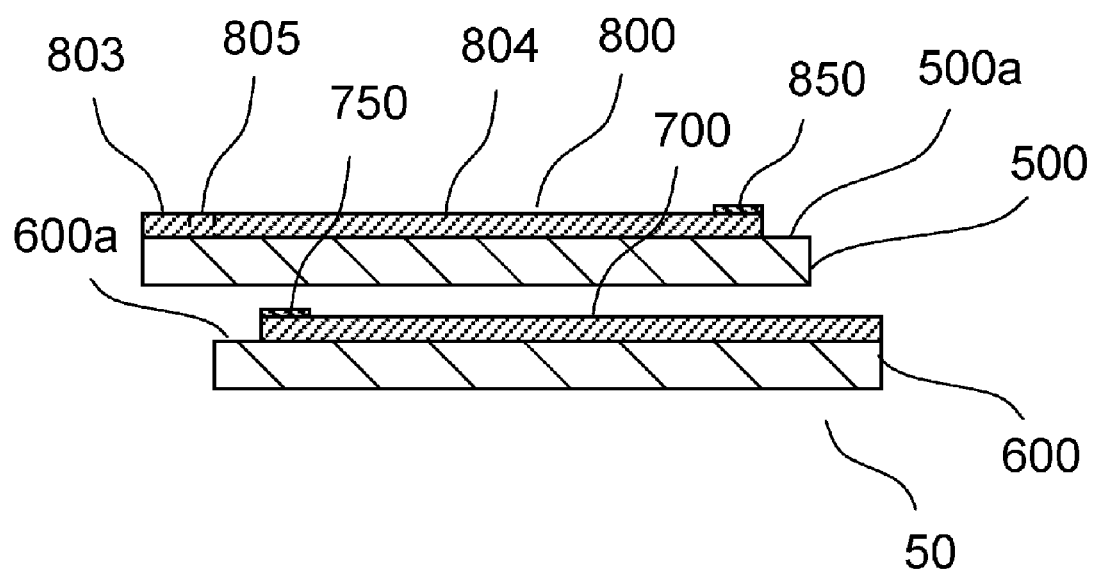

In the second exemplary embodiment, first deposition electrode 700 is formed on one (upper) film surface 500a of first film 500, and second deposition electrode 800 is formed on the other (upper) film surface 600a of second film 600. Meanwhile, as shown in FIG. 5D, first deposition electrode 700 may be formed on one (upper) film surface 500a of first film 500, and second deposition electrode 800 may be formed on the other (lower) film surface 500b of first film 500. Further, as shown in FIG. 5E, second deposition electrode 800 may be formed on one (upper) film surface 500a of first film 500, and first deposition electrode 700 may be formed on the other (lower) film surface 500b of first film 500. In these cases, first film 500 has a larger width dimension than second film 600. Further, as shown in FIG.

5F, second deposition electrode 800 may be formed on one (upper) film surface 500a of first film 500, and first deposition electrode 700 may be formed on the other (upper) film surface 600a of second film 600.

Figure 6A:
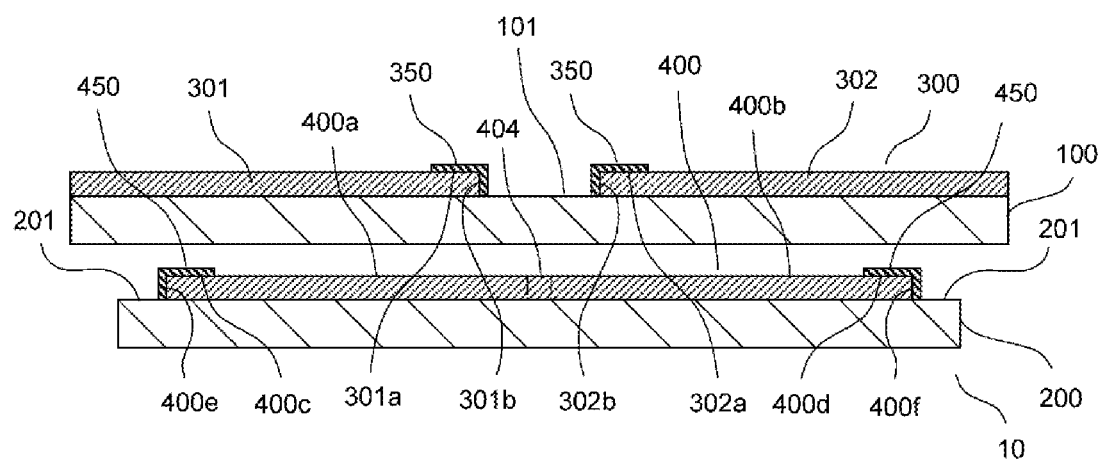
FIGS. 6A and 6B are views for explaining capacitor bodies according to modification examples.
Figure 6B:
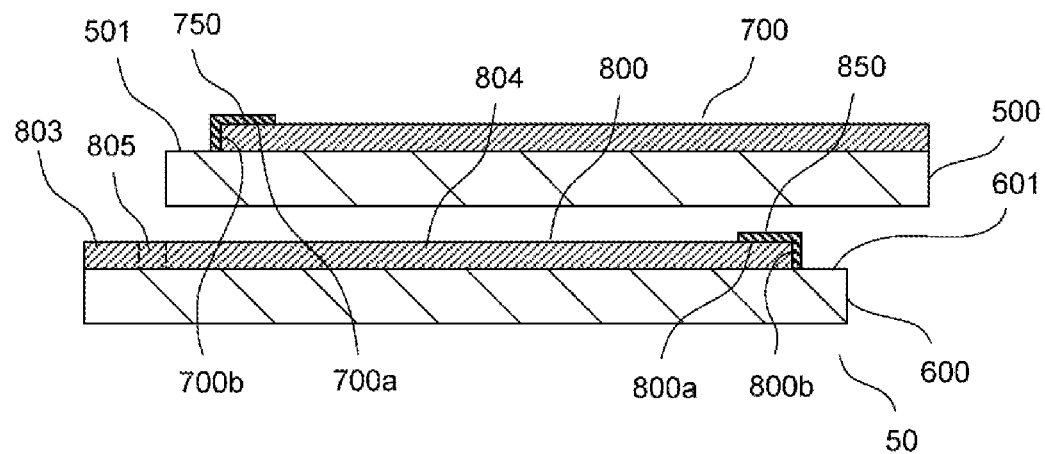

Further, in the first exemplary embodiment mentioned above, as shown in FIG. 6A, first zinc-containing layer 350 may be extended to cover each of end 301b of first continuous electrode 301 and end 302b of second continuous electrode 302, each of which is located at a side close to middle insulating margin part 101. And second zinc-containing layer 450 may be extended to cover each of end 400e of first one-side electrode 400a and end 400f of second one-side electrode 400b, each of which is located at a side close to end insulating margin part 201. Likewise, in the second exemplary embodiment mentioned above, as shown in FIG. 6B, first zinc-containing layer 750 may be extended to cover end 700b of first deposition electrode 700, which is located at a side close to first insulating margin part 501. And second zinc-containing layer 850 may be extended to cover end 800b of second deposition electrode 800, which is located at a side close to second insulating margin part 601. Thus, corrosion can be expected to be further inhibited.

Figure 7A:
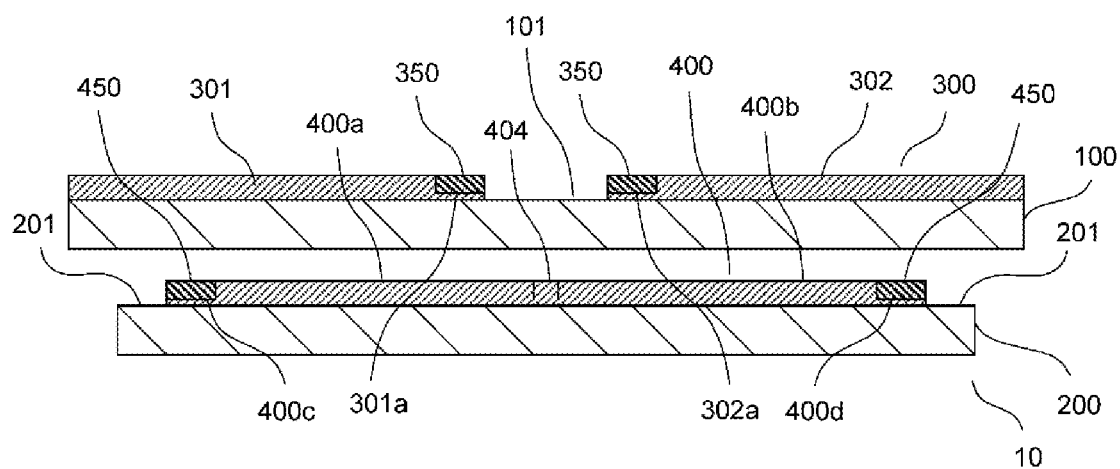
FIGS. 7A and 7B are views for explaining capacitor bodies according to modification example.

Furthermore, in the first exemplary embodiment mentioned above, as shown in FIG. 7A, first continuous electrode 301 and second continuous electrode 302 may be adapted such that a thickness of the aluminum-containing layer at each of ends 301a, 302a is smaller than a thickness of the aluminum-containing layer at another part, and a total thickness of the aluminum-containing layer and first zinc-containing layer 350 is substantially equal to the thickness of the aluminum-containing layer at the another part. Thus, the metal layer including the aluminum-containing layer and first zinc-containing layer 350 at each of ends 301a, 302a can be further reduced in thickness. Therefore, it is possible to scatter the metal layers further easily when breakdown occurs at these parts, and thus it is possible to further suppress the generation of leakage current. It is to be noted that, in this case, when first zinc-containing layer 350 is thicker than the aluminum-containing layer, corrosion can be further inhibited. Likewise, first one-side electrode 400a and second one-side electrode 400b may be adapted such that a thickness of the aluminum-containing layer at each of ends 400c, 400d is smaller than a thickness of the aluminum-containing layer at another part, and a total thickness of the aluminum-containing layer and second zinc-containing layer 450 is substantially equal to the thickness of the aluminum-containing layer at the another part. It is to be noted that, in this case, second zinc-containing layer 450 is preferably thicker than the aluminum-containing layer.

Figure 7B:
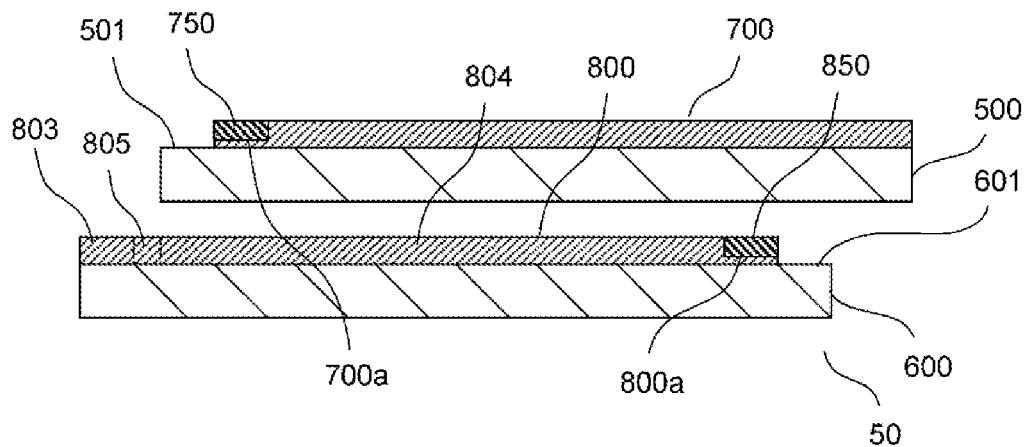

Furthermore, likewise, in the second exemplary embodiment mentioned above, as shown in FIG. 7B, first deposition electrode 700 may be adapted such that a thickness of the aluminum-containing layer at end 700a is smaller than a thickness of the aluminum-containing layer at another part, and a total thickness of the aluminum-containing layer and first zinc-containing layer 750 is substantially equal to the thickness of the aluminum-containing layer at the another part. And second deposition electrode 800 may be adapted such that a thickness of the aluminum-containing layer at end 800a is smaller than a thickness of the aluminum-containing layer at another part, and a total thickness of the aluminum-containing layer and second zinc-containing layer 850 is substantially equal to the thickness of the aluminum-containing layer at the another part. It is to be noted that, in this case, first zinc-containing layer 750 is preferably thicker than the aluminum-containing layer of first deposition electrode 700, whereas second zinc-containing layer 850 is preferably thicker than the aluminum-containing layer of second deposition electrode 800.

Furthermore, in the first exemplary embodiment mentioned above, capacitor body 10 is constituted by, but not limited thereto, making first film 100 and second film 200 wound. More specifically, in FIGS. 1 and 2, capacitor body 10 of first film 100 and second film 200 alternately stacked may be adopted in place of capacitor body 10 made first film 100 and second film 200 wound. In such a case, for the sake of convenience, a direction connecting first end-face electrode 30 and second end-face electrode 40 is referred to as a widthwise direction, and a direction perpendicular to the connecting direction is referred to as a longitudinal direction. Likewise, in FIGS. 3 and 4, capacitor body 50 of first film 500 and second film 600 alternately stacked may be adopted in place of capacitor body 50 made first film 500 and second film 600 wound. In such a case, for the sake of convenience, a direction connecting first end-face electrode 70 and second end-face electrode 80 is referred to as a widthwise direction, and a direction perpendicular to the connecting direction is referred to as a longitudinal direction.

Furthermore, a configuration may be adopted such that first zinc-containing layer 350 is formed at each of end 301a of first continuous electrode 301 and end 302a of second continuous electrode 302, whereas second zinc-containing layer 450 is not formed at each of end 400c of first one-side electrode 400a and end 400d of second one-side electrode 400b. On the other hand, a configuration may be adopted such that first zinc-containing layer 350 is not formed at each of end 301a of first continuous electrode 301 and end 302a of second continuous electrode 302, whereas second zinc-containing layer 450 is formed at each of end 400c of first one-side electrode 400a and end 400d of second one-side electrode 400b.

Likewise, a configuration may be adopted such that first zinc-containing layer 750 is formed on end 700a of first deposition electrode 700, whereas second zinc-containing layer 850 is not formed on end 800a of second deposition electrode 800. On the other hand, a configuration may be adopted such that first zinc-containing layer 750 is not formed on end 700a of first deposition electrode 700, whereas second zinc-containing layer 850 is formed on end 800a of second deposition electrode 800.

In the above first exemplary embodiment, the present disclosure is applied to film capacitor 1A structured to have two capacitors connected in series. However, the present disclosure can also be applied to a film capacitor structured to have three or more capacitors connected in series.

Other than the above modifications, various modifications can be appropriately made to the exemplary embodiments of the present disclosure within the scope of the technical idea disclosed in the claims.

The present disclosure is useful for a film capacitor used in various electronic devices, electric devices, industrial devices, vehicular electrical equipment, and the like.

What is claimed is:
1. A film capacitor comprising:
  a first film;
  a second film;
  a first electrode part including a first aluminum-containing layer disposed on a first film surface that is one principal surface of the first film; and
  a second electrode part including a second aluminum-containing layer disposed on a second film surface that is one of another principal surface of the first film and a principal surface of the second film that faces to the another principal surface, wherein:

the first film and the second film stacked on one another are wound or stacked, the first film surface is provided with a first non-electrode part that does not include the first aluminum-containing layer, the first non-electrode part extending in a longitudinal direction of the first film surface, the first electrode part has a first end adjacent to the first non-electrode part in a widthwise direction of the first film surface, the second film surface is provided with a second non-electrode part that does not include the second aluminum-containing layer, the second non-electrode part extending in a longitudinal direction of the second film surface, the second electrode part has a second end adjacent to the second non-electrode part in a widthwise direction of the second film surface, each of the first electrode part and the second electrode part includes an effective electrode region in which the first aluminum-containing layer and the second aluminum-containing layer overlap each other from viewing in a direction perpendicular to the first film surface, the film capacitor further comprises a first zinc-containing layer disposed on a surface of a part including the first end in the effective electrode region of the first electrode part, and a second zinc-containing layer disposed on a surface of a part including the second end in the effective electrode region of the second electrode part, the first zinc-containing layer is smaller in thickness than the first aluminum-containing layer, and the second zinc-containing layer is smaller in thickness than the second aluminum-containing layer.

2. The film capacitor according to claim 1, wherein:
the first zinc-containing layer covers an end surface of the first electrode part at a side close to the first non-electrode part, and
the second zinc-containing layer covers an end surface of the second electrode part at a side close to the second non-electrode part.

3. The film capacitor according to claim 1, wherein:
a thickness of the first aluminum-containing layer at the first end is smaller than a thickness of the first aluminum-containing layer at another part of the first electrode part, and a total thickness of the first aluminum-containing layer and the first zinc-containing layer at the first end is substantially equal to the thickness of the first aluminum-containing layer at the another part of the first electrode part, and
a thickness of the second aluminum-containing layer at the second end is smaller than a thickness of the second aluminum-containing layer at another part of the second electrode part, and a total thickness of the second aluminum-containing layer and the second zinc-containing layer at the second end is substantially equal to the thickness of the second aluminum-containing layer at the another part of the second electrode part.

4. The film capacitor according to claim 1, wherein:
the first zinc-containing layer has a part in contact with the second film, and
the first aluminum-containing layer has a part in contact with the second film.

5. A film capacitor comprising:
a first film;
a second film;
a first electrode part including a first aluminum-containing layer disposed on a first film surface that is one principal surface of the first film; and
a second electrode part including a second aluminum-containing layer disposed on a second film surface that is one of another principal surface of the first film and a principal surface of the second film that faces to the another principal surface, wherein:

the first film and the second film stacked on one another are wound or stacked, the first film surface is provided with a first non-electrode part that does not include the first aluminum-containing layer, the first non-electrode part extending in a longitudinal direction of the first film surface and splitting the first electrode part into two parts in a widthwise direction of the first film surface, each of the two parts of the first electrode part has a first end adjacent to the first non-electrode part, the second film surface is provided with a second non-electrode part that does not include the second aluminum-containing layer, the second non-electrode part being disposed at each of both ends in a widthwise direction of the second film surface, the second electrode part has a second end adjacent to the second non-electrode part, the film capacitor further comprises a first zinc-containing layer disposed on a surface of a part including the first end of the first electrode part, and a second zinc-containing layer disposed on a surface of a part including the second end of the second electrode part, the first zinc-containing layer is smaller in thickness than the first aluminum-containing layer, and the second zinc-containing layer is smaller in thickness than the second aluminum-containing layer.

6. The film capacitor according to claim 5, wherein
the first zinc-containing layer covers an end surface of the first electrode part at a side close to the first non-electrode part, and
the second zinc-containing layer covers an end surface of the second electrode part at a side close to the second non-electrode part.

7. The film capacitor according to claim 5, wherein:
a thickness of the first aluminum-containing layer at the first end is smaller than a thickness of the first aluminum-containing layer at another part of the first electrode part, and a total thickness of the first aluminum-containing layer and the first zinc-containing layer at the first end is substantially equal to the thickness of the first aluminum-containing layer at the another part of the first electrode part, and
a thickness of the second aluminum-containing layer at the second end is smaller than a thickness of the second aluminum-containing layer at another part of the second electrode part, and a total thickness of the second aluminum-containing layer and the second zinc-containing layer at the second end is substantially equal to the thickness of the second aluminum-containing layer at the another part of the second electrode part.

8. The film capacitor according to claim 5, wherein:
the first zinc-containing layer has a part in contact with the second film, and
the first aluminum-containing layer has a part in contact with the second film.

9. A film capacitor comprising:
a first film;
a second film;

a first electrode part including a first aluminum-containing layer disposed on a first film surface that is one principal surface of the first film; and
a second electrode part including a second aluminum-containing layer disposed on a second film surface that is one of another principal surface of the first film and a principal surface of the second film that faces to the another principal surface, wherein:
the first film and the second film stacked on one another are wound or stacked,
the first film surface is provided with a first non-electrode part that does not include the first aluminum-containing layer, the first non-electrode part extending in a longitudinal direction of the first film surface,
the first electrode part has a first end adjacent to the first non-electrode part in a widthwise direction of the first film surface,
the second film surface is provided with a second non-electrode part that does not include the second aluminum-containing layer, the second non-electrode part extending in a longitudinal direction of the second film surface,
the second electrode part has a second end adjacent to the second non-electrode part in a widthwise direction of the second film surface,
each of the first electrode part and the second electrode part includes an effective electrode region in which the first aluminum-containing layer and the second aluminum-containing layer overlap each other from viewing in a direction perpendicular to the first film surface,
the film capacitor further comprises a zinc-containing layer disposed on at least one of a surface of a part including the first end in the effective electrode region of the first electrode part and a surface of a part including the second end in the effective electrode region of the second electrode part,
the zinc-containing layer of the first electrode part is smaller in thickness than the first aluminum-containing layer, and
the zinc-containing layer of the second electrode part is smaller in thickness than the second aluminum-containing layer.

* * * * *